United States Patent [19]

Gage et al.

[11] 3,776,446

[45] Dec. 4, 1973

[54] FRICTION WELDING APPARATUS

[75] Inventors: Arthur F. Gage, Warren; Alex F. Stamm, Rochester, both of Mich.

[73] Assignee: Rockwell International Corporation, Pittsburgh, Pa.

[22] Filed: Jan. 5, 1973

[21] Appl. No.: 321,489

Related U.S. Application Data

[62] Division of Ser. No. 151,767, June 10, 1971, Pat. No. 3,727,298.

[52] U.S. Cl. .......................... 228/2, 29/470.3, 156/73

[51] Int. Cl. .......................... B23k 27/00

[58] Field of Search .......................... 228/2; 29/470.3; 156/73

[56] References Cited

UNITED STATES PATENTS

| | | | |
|---|---|---|---|
| 3,234,646 | 2/1966 | Hollander | 228/2 X |
| 3,238,612 | 3/1966 | Herman | 228/2 |
| 3,388,849 | 6/1968 | Blum et al. | 228/2 |
| 3,484,926 | 12/1969 | Blum et al. | 29/470.3 |

*Primary Examiner*—Robert D. Baldwin
*Assistant Examiner*—Robert J. Craig
*Attorney*—John R. Bronaugh et al.

[57] ABSTRACT

Method and apparatus for friction welding two rotating end workpieces to a non-rotatable central workpiece wherein one end workpiece is held axially stationary while the other end workpiece is moved axially into engagement with the central workpiece and then axially displaces the central workpiece into engatement with the one end workpiece. The central workpiece is mounted on a floating table which is axially displaceable to accomplish the described welding cycle.

6 Claims, 2 Drawing Figures

38 40 54 A C B 26 30 60 25 46 56 42 24 136 18 36 17 15 17 52 34 14 13 50 11 12 22 23 R L 12a 12b 19 32 16 48 138 28 LS1A LS2A 120 62 LS2B LS1B 44

FRICTION WELDING APPARATUS

This is a division, of U.S. Pat. application Ser. No. 151,767, filed June 10, 1971 now U.S. Pat. NO. 3,727,298.

FIELD OF INVENTION

This invention relates generally to apparatus for friction welding workpieces together, and more particularly, to apparatus for friction welding the parts of an axle drive housing together, that is, friction welding a pair of end spindles onto a center axle housing section.

SUMMARY OF THE INVENTION

The primary object of this invention resides in the provision of a novel apparatus for friction welding workpieces together.

Another object of the invention resides in the provision of a novel apparatus for friction welding a pair of end workpieces to a center workpiece by axially engaging and forcing the workpieces together.

Still another object of the invention resides in the provision of a novel method for friction welding the parts of an axle drive housing together, wherein the end spindles are rotated relative to the center housing section and, during the weld cycle, one of the end spindles is maintained axially stationary while the other end spindle and center housing section are axially displaced to effect engagement between the three workpieces under a high axial thrust to friction weld the three pieces together.

A further object of the invention resides in the provision of a novel apparatus for friction welding the parts of an axle drive housing together by mounting the center axle housing section on a floating slidable table, and during the weld cycle, maintaining one of the end spindles axially stationary while the other end spindle and center section are displaced axially to effect engagement between each of the end spindles and center section and thereby frictionally weld the three workpieces together.

Still other objects and advantages of the invention will become apparent from reading the following detailed description of the invention with reference to the accompanying drawings, with the scope of the invention, however, being limited only by the appended claims.

DESCRIPTION OF THE PREFERRED EMBODIMENT

Figure 1:
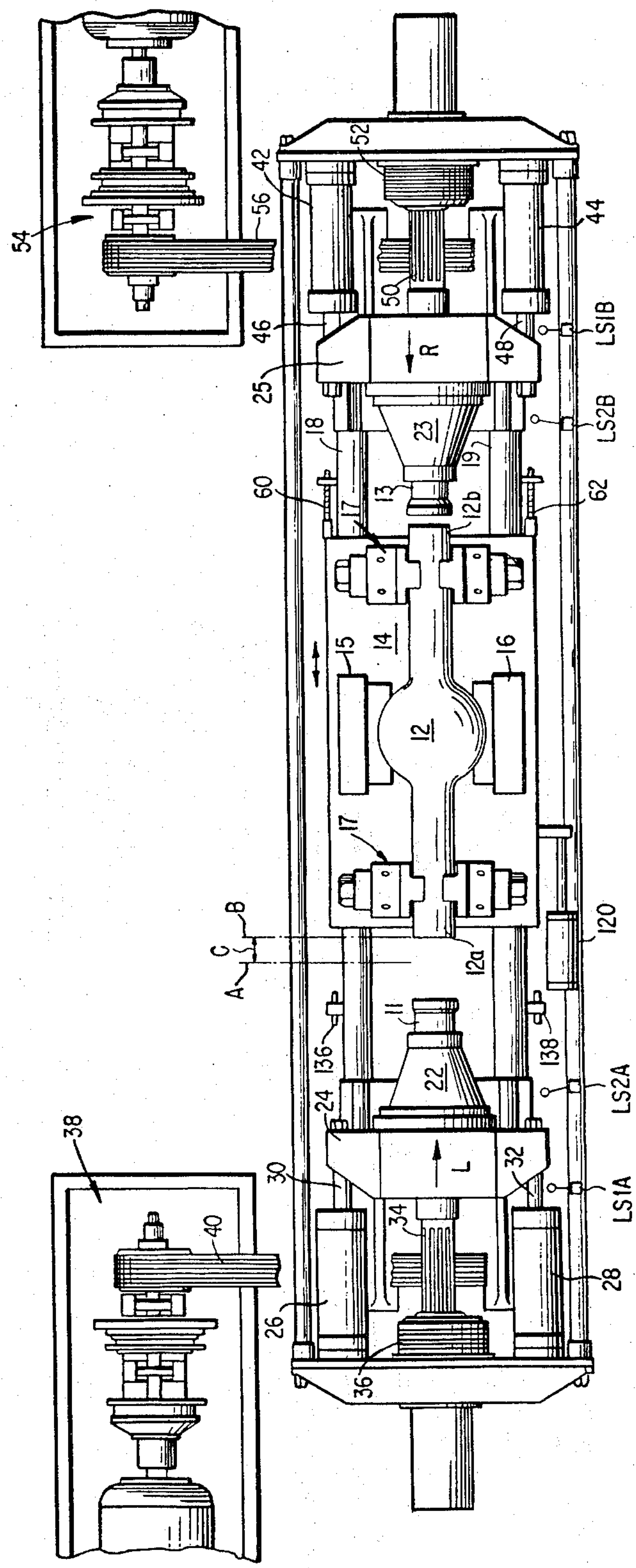
FIG. 1 is a top plan view of a friction welding apparatus that may be used to accomplish the method of this invention.

Referring now to FIG. 1, the apparatus of the invention is especially adapted for friction welding the three workpieces 11, 12 and 13 together, particularly wherein workpieces 11 and 13 are end spindles and workpiece 12 is a center axle housing section of an axle drive assembly. In operation during a weld cycle, end workpieces 11 and 13 are rotated relative to center section 12 and workpiece 11 is maintained axially stationary while workpiece 13 is moved axially to the left into engagement with arm **12*b* of center section 12, whereupon center section 12 is then also moved to the left until its other arm 12*a* engages workpiece 11**, thereby friction welding the three workpieces together.

Center section 12 is mounted on a cradeling table structure 14 whereon opposite sides of the workpiece are engaged and held suitable by adjustable jaws 15 and 16. The opposite extending arms **12*a* and 12*b* of workpiece 12 are clamped tightly in similar fixtures 17, which grip and fix the arms against rotation and axial movement on table 14. The table 14 is axially slidably mounted on guide rails 18 and 19** which extend substantially throughout the length of the friction welding apparatus.

Workpiece 11 is mounted within a hydrostatic bearing unit carrier 22, which has a frame 24 slidably mounted on rails 18 and 19. Similarly workpiece 13 is mounted in a hydrostatic bearing unit carrier 23, having a frame 25 which is also slidable along the guide rails 18 and 19.

Carrier frame 24 is axially displaceable along guide rails 18 and 19 by way of a pair of hydraulic cylinders 26 and 28, the piston rods 30 and 32 of which arre connected to the frame 24 for axially displacing the workpiece 11 on rails 18 and 19 toward center section 12. Within carrier unti 22, workpiece 11 is drive connected to a rotatable shaft 34 axially slidable within drive pulley 36 via a spline connection, with the pulley 36 being driven from a drive assembly 38 via belt 40 to rotate the workpiece 11 during the weld cycle.

Similarly, the carrier unit 23 is axially displaceable by way of a pair of hydraulic piston cylinders 42 and 44, the piston rods 46 and 48 of which are connected to the carrier support 25 for moving the support axially along guide rails 18 and 19. Within carrier unit 23, workpiece 13 is drive connected to a rotatable shaft 50 which is slidable within a pulley 52 via a spline connection, with the pulley 52 being rotated from a drive system 54 via belt connection 56.

It should be noted that cylinders 26 and 28 are larger in diameter than cylinders 42 and 44, and the purpose for this difference will become apparent hereinbelow.

For a more detailed description of the carrier units 22 and 23 and their respective drive systems, reference may be had to U.S. Pat. application Ser. No. 753,214, filed on Aug. 16, 1968, which application is assigned to the assignee of this invention.

Briefly, initially the carriers 22 and 23 will be positioned in their extreme retracted end positions to permit loading of the workpieces 11 and 13 therein and to permit placement of the center section 12 on the table 14. When the loading is completed, workpieces 11 and 13 will be rotated from the drive systems 38 and 54 and the hydraulic control circuit illustrated in FIG. 2 will be motivated to move the carrier unit 22 and workpiece 11 to the right until the pistons within hydraulic cylinders 26 and 28 bottom out, i.e., engage against the inboard ends of cylinders 26 and 28, to position the end of workpiece 11 at a predetermined "start" position A. Table 14 and the center housing section 12 mounted thereon will also be moved to the right to a predetermined "start" position shown in FIG. 1, established by the adjustable stop members 60 and 62 which are fixed adjacent the guide rails 18 and 19 to abut the table 14. When workpieces 11 and 12 are so located in their "start" positions, the opposing ends of workpiece 11 and arm 12*a* will be located respectively at positions A & B and separated a distance C. Carrier unit 23 and workpiece 13 will also be moved to the left toward the arm 12*b* of center section 12.

The stop members 60 and 62 which establish the initial "start" position of table 14 are adjusted so that when the pistons in cylinders 26 and 28 reach their forward end positions and bottom out, the end of workpiece 11 is spaced a predetermined distance C, for example, ⅛ – ¼ inches from the opposing end face of arm 12*a*, so that initially there is no contact between workpiece 11 and arm 12*a*. Also, the travel speed of unit carrier 23 and workpiece 13 is adjusted by the cylinders 42 and 44 so that table 14 will engage stops 60 and 62 and cylinders 26 and 28 will bottom out, thereby fixing the start positions of table 14 and workpiece 11, before the workpiece 13 contacts the opposing face of arm 12*b*. Thereafter, the rotating workpiece 13 continues to be moved axially by cylinders 42 and 44 into engagement with arm 12*b* and then causes axial displacement of table 14 to the left on rails 18 and 19 so that the arm 12*a* will be moved into engagement with the rotating workpiece 11, which is held in a fixed axial position by the hydraulic pressure within cylinders 26 and 28.

The high speed of rotation of workpieces 11 and 13 against the non-rotatable fixed arms 12*a* and 12*b*, and the axial thrust with which the three workpieces are forced together causes the metal of the engaging faces of the workpiece to become plastic. Subsequently, rotation of the workpieces is stopped and the plasticized metal allowed to cool to form the weld sections between the workpieces 11, 12 and 13. When the weld sections have cooled, the workpieces 11 and 13 are released from carrier units 22 and 23, which are then retracted to their load positions in readiness for the next welding cycle.

Figure 2:
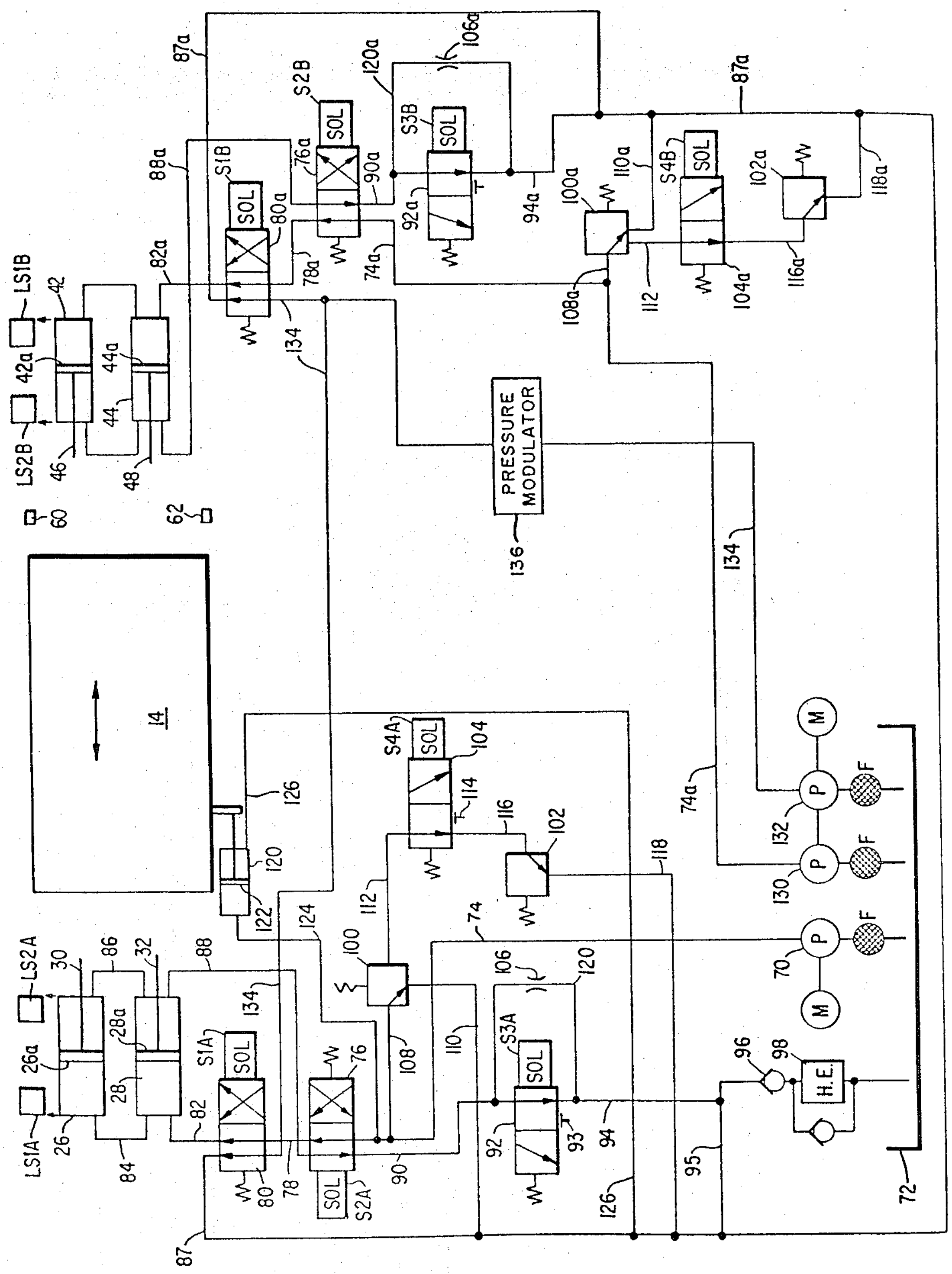
FIG. 2 is a schematic illustration of a hydraulic control circuit for controlling the axial displacement of the end workpieces and central workpiece during a welding operation.

Referring now to FIG. 2, a typical hydraulic control circuit will be described for operating the welding apparatus of FIG. 1 and accomplishing the method of operation briefly set forth above.

Assume carrier units 22 and 23 are retracted to their load positions in which suitable workpieces 11 and 13 are mounted in the units and a center workpiece 12 is clamped on table 14. In this position, pistons 26*a* and 28*a* will be bottomed against the outboard ends (left ends) of cylinders 26 and 28 and pistons 42*a* and 44*a* will be positioned adjacent the outboard ends (right ends) of cylinders 42 and 44. When loaded workpieces 11 and 13 will be rotated by energization of drive assemblies 38 and 54.

With solenoids S1A, S1B initially de-energized and solenoids S2A, S2B and S3B energized, the valves controlled thereby will be positioned as shown in FIG. 2. Valve 104 is shown when solenoid S4A is de-energized. However, initially solenoid S4A will be energized and valve 104 will be in its other flow blocking position.

The welding cycle will proceed as follows, with movement of carrier 22 being described first. Pump 70 will drive fluid oil from a reservoir sump 72 and pass it via conduit 74, a spring-biased, solenoid operated four way valve 76 operated by solenoid S2A, conduit 78, one outlet port of a spring biased, solenoid operated valve 80 operated by solenoid S1A, and conduit 82 to the outboard end of cylinder 28 which is interconnected with the outboard end of cylinder 26 via conduit 84. The inboard ends of cylinders 26 and 28 are interconnected by conduit 86.

Another outlet port from valve 80 is also connected via conduit 95, and in the illustrated position of valve 80 serves to connect a conduit 134 to sump 72. In the other position of valve 80, conduit 87 will connect conduit 78 to sump 72.

The fluid provided at the outboard ends of cylinders 26 and 28 will cause pistons 26a and 28a to be displaced to the right, thereby sliding carrier 22 along guides 18 and 19 to the right. The fluid ahead of the pistons will drain through a conduit 88, the outlet port of valve 76, conduit 90, and a solenoid operated valve 92 operated by solenoid S3A, with valve 92 in its illustrated position being connected to the sump 72 via conduits 94 and 95, check valve 96, and heat exchanger 98. Check valve 96 serves to maintain a low pressure of about 50–75 psig in the oil return conduit 95 as a pilot source for the various solenoid operated valves.

Carrier 22 will thus proceed to the right at a rapid travel rate established by the rate of oil flow to the outboard ends of cylinders 26 and 28. This rate of oil flow is determined by the oil displacement of pump 70 and the setting of a flow relief valve 100. Valve 100 is positioned with its inlet port connected by a conduit 108 to conduit 74 between valve 76 and pump 70. One of the outlet ports of valve 100 is connected by a conduit 108 to conduit 74 between valve 76 and pump 70. One of the outlet ports of valve 100 is connected by a conduit 110 to conduit 87. The setting of relief valve 100 is sufficiently high that no fluid flow will occur therethrough as long as pistons 26*a* and 28*a* have not bottomed out and carrier 22 is moving towards the right. Rapid travel of carrier 22 thus is achieved because the full displacement of pump 70 is directed to the outboard ends of cylinders 26 and 28 and fluid flow from the inboard ends of this cylinder is unrestricted because valve 92 is open.

The rapid travel rate of carrier 22 will continue until limit switch LS2A is activated by frame 24 and the rate of flow of oil to cylinders 26 and 28 to reduced to effect the slower, creep rate of travel of carrier 22 until pistons 26*a* and 28*a* bottom out or engage against the inborad ends of cylinders 26 and 28 and the end of workpiece 11 is located at its predetermined weld position indicated by the reference line A in FIG. 1. To control the rate of oil flow rate into cylinders 26 and 28 for slowing the travel of carrier 22 to the creep rate, a relief valve 102, a solenoid-operated valve 104 and a variable pressure temperature compensated restrictor 106 are provided.

A vent control passage 112 operatively associated with valves 100 and 104 is connected between a pilot valve (not shown) in valve 100 and valve 104. Valve 104 has two outlet ports, one of which is blocked as at 114 and the other of which is connected by a conduit 116 to the inlet port of relief valve 102. The outlet port of valve 102 is connected by a conduit 118 to conduit 87.

Restrictor 106 is disposed in a bypass conduit 120 which is connected between conduits 90 and 94. When valve 92 is shifted to its flow-blocking position established by blocking element 93, circulation of return oil is from conduit 90 through restrictor 106 to conduit 94.

Valve 104 that is in a flow blocking position during rapid travel of carrier 22 is operated by solenoid S4A which, when de-energized upon activation of limit switch LS2A, allows valve 104 to be spring biased to its illustrated position where it connects passage 112 to conduit 116. Under this condition, relief valve 102 operatively is connected to oil input conduit 74. The setting of valve 102 is such that a greater volume of oil is bled off when valve 104 is open than when only relief valve 100 is connected to conduit 74. Thus the volume of oil flowing to cylinders 26 and 28 markedly is lessened when valve 104 is open.

Further, upon the activation of limit switch LS2A, solenoid S3A is de-energized, and flow through valve 92 is blocked. Flow control restrictor 106 thus is placed in the exhaust circuit from the inboard ends of cylinders 26 and 28 and functions to retard the flow rate of oil from these cylinders until the pistons 26*a* and 28*a* have bottomed out at the right extremes of their cylinders.

From the foregoing it is clear that when initially solenoids S4A and S2A are energized and when solenoid S1A is de-energized, oil will be supplied to the outboard ends of cylinders 26 and 28 at a relatively high rate of flow. At this stage, solenoid S3A will also be energized to provide a relatively unrestricted discharge path for quickly exhausting the oil at the inboard sides of pistons 26*a* and 28*a*. As a result, carrier 22 is advanced forwardly quite rapidly from its retracted loading position.

As carrier 22 approaches the position where pistons 26*a* and 28*a* are about to engage the inboard end of cylinders 26 and 28 and end spindle 11 is about to reach the predetermined start position A., the limit switch LS2A is activated and solenoids S4A and S3A are de-energized. As described above, the pressure relief valves then function to limit the flow of oil to the outboard sides of pistons 26*a* and 28*a* while simultaneously de-energization of solenoid S3A allows valve 92 to be spring biased to its position where it blocks oil flow from conduit 90 to conduit 94. The oil being exhausted from the inboard ends of cylinders 26 and 28 consequently must flow through restrictor 106. This retards the rate of oil discharge from the inboard ends of cylinders 26 and 28 to thereby increase the back pressure acting on the inboard sides of pistons 26*a* and 28*a*. This rapidly decelerates the forward advancement of carrier 22 to slow it down in a relatively short distance and thus allow pistons 26a and 28a to gently contact the inboard ends of cylinders 26 and 28 and stop sliding movement of carrier 22. The end of spindle 11 is then located at position A.

As described previously, the slidable table 14, is initially moved toward the right to a predetermined position on guides 18 and 19 in engagement with stops 60 and 62 so that the end of arm 12*a* will be located at a position B and spaced a predetermined distance C from the end of spindle 11 located at position A when pistons 26*a* and 28*a* are bottomed. The distance C is preferably about ⅛ to ¼ inches.

An actuating cylinder 120 has a piston 122 whose rod is connected to table 14. One end of cylinder 120 is connected via conduit 124 to cylinder 74 between pump 70 and valve 76, and the other end of cylinder 120 is connected to drain conduit 87 via conduit 126. Thus, when pump 70 is initially energized, oil will flow through conduit 124 to displace piston 122 and table 14 to the right until the table engages the stops 60 and 62. The table is then held in this position by cylinder 120 as long as pump 70 and conduit 74 remain connected to cylinders 26 and 28.

The hydraulic control system for controlling the movement of pistons 42*a* and 44*a*, and likewise the sliding movement of carrier 23 and spindle 13, is essentially a duplicate of that described for pistons 26*a* and 28*a* and like elements are indicated by like numerals followed by the letter *a*.

Thus, initially oil from an adjustable variable displacement pump 130 passes through a conduit 74*a* and valves 76*a* and 80*a* to the outboard ends of cylinders 42 and 44, thereby causing pistons 42*a* and 44*a* to move to the left at a rapid travel rate. When limit switch LS2B is activated by carrier frame 25, solenoids S3B and S4B will be de-energized and valves 92*a* and 104*a* positioned to decrease the rate of oil flow in conduit 74*a* and place flow restrictor 106*a* into the cylinder exhaust circuit to thereby cause pistons 42*a* and 44*a* and carrier 23 to move at a slower creep rate. In this way, the end of rotating spindle 13 will gently engage the end of arm 12*b*. After engagement of the opposing ends of spindle 13 and arm 12*b*, a timer (not shown) energizes solenoids S1A and S1B a fixed increment of time, such as one second, after the actuation of limit switches LS2A and LS2B to move valves 80 and 80*a* to their other operating positions in which conduit 78 and 78*a* are connected to the drain conduits 87 and 87*a* and the oil from pumps 70 and 130 is merely circulated back to sump 72.

Up to this time, oil from a high pressure weld pump 132 will have passed through conduit 134 through the de-energized valves 80 and 80*a* to conduits 87 and 87*a* back to sump 72. It is desirable that oil from pump 132 pass through a modulator unit 136 positioned in conduit 134 prior to arriving at valves 80 and 80*a*. Modulator 136 comprises no part of the present invention and reference hereby is made to said U.S. Pat. application No. 753,214 for details of the construction and function of this modulator.

However, when solenoids S1A and S1B are energized and valves 80 and 80*a* are moved to their operating positions, the higher pressure oil from conduit 134 is passed through conduits 82 and 82*a* to the outboard ends of cylinders 26 and 28 and cylinders 42 and 44.

Consequently, carrier 23 will be moved to the left and if spindle 13 is not already engaged with arm 12*b* will quickly be so engaged and table 14 will also slide to the left on guides 18 and 19. Arm 12*a*, after passing through the distance C., will engage spindle 11 which is held axially stationary by carrier 22 and cylinders 26 and 28. This is so because cylinders 26 and 28 are larger in diameter than cylinders 42 and 44, and the same weld pressure from conduit 134 is applied to all the cylinders.

Rotation of spindles 11 and 13, which then are engaged with arms 12*a* and 12*b*, causes the contacting material to become plastic and, when rotation is stopped, the plastic material will cool to form the weld.

In an actual operation, the variable displacement pump 130 is adjusted to provide a travel rate for carrier 23 which permits the pistons 26*a* and 28*a* to bottom out against the inboard ends of cylinders 26 and 28 and also permits table 14 to abut against stops 60 and 62 before there is any engagement between the ends of spindle 13 and arm 12*b*. This assures that for every welding cycle, initially table 14 engages stops 60 and 62 and the end of spindle 11 is axially located at the predetermined start position A. In addition, for various sized center axle housing sections 12, the adjustable stops 60 and 62 will be adjusted so that the distance C between the opposing ends of spindle 11 and arm 12*a* is the same, i.e., approximately ⅛ to ¼ inches.

It readily may be appreciated, however, that this same result may be achieved by designing stops 60 and 62 as fixed stops and providing that the effective length of piston rods 30 and 32 may be varied by adjustment to achieve the desired distance C.

During the weld cycle, the carrier 23 will travel through approximately 1½ to 2 inches after contact between end spindle 13 and arm 12*b* and thereafter table 14 will travel through about ¾ to 1 inch. The displaced plastic material between the engaging ends of spindle 11 and arm 12*a* and spindle 13 and arm 12*b* form the welds.

After a period of time, rotation of spindles 11 and 13 is stopped. The welds are permitted to cool, and spindles 11 and 13 are released from carriers 22 and 23. Solenoids S1A and S1B are de-energized and solenoids S3A, S3B and S4A, S4B are re-energized. Solenoids S2A and S2B are then energized to apply oil to the inborad ends of cylinders 26, 28, 42 and 44 to return the carriers 22 and 23 to their retracted loading positions ready for the next welding cycle.

As the carriers 22 and 23 return to the retracted position, limit switches LS1A and LS1B are actuated to deenergize solenoids S2A and S2B, thereby stopping the flow of oil to the inboard sides of cylinders 26, 28, 42 and 44. This allows the cylinder pistons to return to the fully retracted positions without any shock loading of the apparatus. The stops 60, 62 and also stops 136, 138 limit the axial sliding movement of table 14 during the stripping operation and insure that spindles 11 and 13 are easily removable from carriers 22 and 23 following a welding cycle.

It is to be understood that various modifications may be made in the described system without departing from the scope of the invention. The hydraulic control circuit of FIG. 2 is merely exemplary of a suitable control system and may be readily modified to suit specific needs. For example, during the weld cycle after the arms 12*a* and 12*b* and end spindles 11 and 13 have been engaged, it may be desirable to provide an extremely high axial thrust via cylinders 26, 28, 42 and 44. To accomplish this, structural means may be readily incorporated in the control system to increase the pressure in conduit 134.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for friction welding first and second rotating end workpieces to opposite ends of a nonrotating central workpiece comprising a base, first and second carrier means for supporting said first and second end workpieces respectively on said base, table support means for said central workpiece slidably mounted on said base between said first and second carrier means, means for holding said first carrier means substantially axially stationary on said base during a weld cycle, and means for moving said second carrier means toward said table means during a weld cycle, whereby during the cycle said first rotating end workpiece mounted on said first carrier means is maintained substantially axially stationary while said second rotating end workpiece mounted on said second carrier means is moved axially into engagement with one end of said central workpiece mounted on said table support means which is then moved axially to place the other end of said central workpiece into engagement with said first workpiece.

2. Apparatus as defined in claim 1, comprising first and second actuator means connected to said first and second carrier means, respectively, for axially displacing both said end workpieces toward said central workpiece, control circuit means for energizing said first actuator means to initially move said first end workpiece toward said central workpiece to a predetermined position spaced from said central workpiece and to then hold said first carrier means and end workpiece substantially axially stationary at said predetermined position, said control circuit means also energizing said second actuator means to move said second carrier means toward said table support means and cause said second end workpiece to engage one end of said central workpiece and thus move said table support means toward said first carrier means so that the other end of said central workpiece engages said first end workpiece.

3. Apparatus as defined in claim 2, comprising first table drive means for initially displacing said table means toward said second carrier means as said first end workpiece is moved to said predetermined position, and adjustable stop means on said base for engagement by said table means to establish the predetermined spacing between opposing ends of said first end workpiece and said central workpiece at the start of a weld operation.

4. Apparatus as defined in claim 3, said control circuit means comprising variable displacement travel pump means for activating said second actuator means to cause axial movement of said second end workpiece at a rate adjusted to permit said table means to engage said stop means and said first end workpiece to reach said predetermined position before said second end workpiece engages said central workpiece.

5. Apparatus as defined in claim 4, comprising second table drive means for urging said table means toward said first carrier means during a weld cycle, with the force applied by said second table drive means being approximately equal to the firction force between said slidable table means and said base.

6. Apparatus as defined in claim 4, said control circuit means comprising first travel pump means for actuating said first actuator means and said first table drive means to move said first end workpiece and said control workpiece to their initial predetermined positions, and weld pump means for providing acutating fluid to said first and second actuator means during the welding operation, said first actuating means being larger than said second actuating means and thereby holding said first carrier means and said first end workpiece axially stationary as said second actuating means moves said second end workpiece into engagement with one end of said central workpiece and then moves said central workpiece axially so that its other end engages said first end workpiece.

* * * * *